United States Patent [19]
Kopecky et al.

[11] Patent Number: 5,972,392
[45] Date of Patent: Oct. 26, 1999

[54] EMBOSSED CHEWING GUM PRODUCT AND METHOD FOR MANUFACTURING SAME

[75] Inventors: Stanley J. Kopecky, Prospect Heights; Barbara L. Admans, Wheaton, both of Ill.

[73] Assignee: WRICO Packaging, Chicago, Ill.

[21] Appl. No.: 08/881,470

[22] Filed: Jun. 24, 1997

[51] Int. Cl.[6] .................................................. A23G 3/30
[52] U.S. Cl. ................................. 426/5; 426/3; 426/383
[58] Field of Search ............................. 426/3, 5, 87, 383

[56] References Cited

U.S. PATENT DOCUMENTS 4,882,175 11/1989 Ream et al. ................................. 426/5
5,447,348 9/1995 Lapierre ..................................... 426/134

FOREIGN PATENT DOCUMENTS 0 144 269  6/1985  European Pat. Off. .
87-74244   4/1987  Japan .
96-116885  5/1996  Japan .

OTHER PUBLICATIONS

Mattel Inc., "Barbie Bubble Gum Shop Instructions", 1995.

*Primary Examiner*—Arthur L. Corbin
*Attorney, Agent, or Firm*—Hill & Simpson

[57] ABSTRACT

A stick of chewing gum is provided as well as methods for manufacturing same. The chewing gum comprises a body constructed from a water soluble gum portion and a water insoluble base, the body including at least one embossed region. A wrapper substantially surrounds the body.

19 Claims, 3 Drawing Sheets

EMBOSSED CHEWING GUM PRODUCT AND METHOD FOR MANUFACTURING SAME

BACKGROUND OF THE INVENTION

The present invention relates generally to chewing gum. More specifically, the present invention relates to sticks of chewing gum and methods for manufacturing same.

Of course, chewing gum products have been known for a great number of years. A variety of different chewing gum products are known, e.g., sugar free, low calorie, etc. Likewise, a number of different shapes of chewing gum are known, e.g., square, rectangular, etc. For example, it is known to provide individual pieces of chewing gum in the form of sticks. These sticks can also have a variety of different shapes although traditionally they have a substantially rectangular shape.

Typically, during the manufacturing process of chewing gum, the gum components (water insoluble gum base and water soluble portion), are mixed together in mixers and then extruded. In the extruder, the gum is formed into sheets, pellets, or ropes. In the case of stick chewing gum, the gum is then processed into sticks. After the processing step the gum is packaged.

The packaging of chewing gum is important to keep the product clean and to reduce the tendency of the chewing gum, during storage or exposure to ambient conditions, to lose or gain moisture. In packaging stick chewing gum, typically the sticks of chewing gum are placed in a wrapper that comprises a composite material having a tissue or paper substrate that contacts the chewing gum. This wrapper may also have an outer metal foil surface. The wrapping process is typically accomplished using high-speed wrapping machines that package the individual units of chewing gum.

Typically, the wrapped individual sticks are then packaged with a number of other wrapped sticks of chewing gum in a counterband. The counterband is usually a composite material such as, an inner layer of aluminum foil with a paper and/or polypropylene outer surface. The counterband seals the individually wrapped pieces of chewing until it is opened by the consumer. The counterband is necessary because typically the wrapper that surrounds the stick of chewing gum does not provide sufficient barrier properties for the long-term storage of chewing gum. It also serves to hold several sticks together into a single sales unit.

However, it is also known to package single units of chewing gum in a wrapper that provides barrier properties. For example, reference is made to U.S. Pat. No. 5,510,124.

One issue in manufacturing chewing gum sticks is the thickness of the product. Although a manufacturer may have a number of different products in its chewing gum line, preferably the same machinery is used to manufacture and especially, package each of the products. If the thickness of the chewing gum stick varies from product to product, this requires modifications to the equipment before a new product is run. This is especially true with respect to the packaging machinery.

Therefore, it is desirable that stick chewing gum products that are packaged (wrapped) on the same equipment have the same thickness. However, if a manufacturer wants to reduce stick weights, or the size of the chewing gum piece, this typically can only be accomplished by reducing the thickness of the stick of chewing gum. It should be noted that it may be necessary to modify the thickness due to changes in customer preferences. The thickness of the chewing gum stick may also be affected by the type of chewing gum product for example, sugar versus sugarfree products may vary in weight and/or density and therefore thickness. But, by so varying the thickness of chewing gum this creates manufacturing and processing issues.

Thickness is especially an issue with respect to the packaging of the chewing gum sticks. Standard wrapping machines dictate that either products having the same thickness are run or changes must be made to the equipment as well as materials used to wrap and house the chewing gum. If a chewing gum stick having a different thickness than a previous product line is run, different packaging materials may be needed. For example, if the same counterband is used for products having variations in thickness, this will cause the products to have slack in the package or will create significant compressibility to the product.

Due to environmental issues, it may be desirable to package chewing gum in a one piece wrapper instead of the current two-piece design, e.g., foil and printed wrapper labels. A one piece wrapper (for example, if the printed wrapper label is omitted) reduces the waste that must be disposed. Furthermore, cost savings may be realized by reducing the amount of packaging material.

However, by using only a one piece wrapper, the resultant thickness of the packaged stick of chewing gum will be reduced. Although this reduction in thickness may not be perceptible with respect to a single stick of chewing gum, a plurality of such wrapped sticks of chewing gum will not fit properly in a standard package. For example, in a seventeen stick package, not using printed labels around each stick of chewing gum, will shrink the total thickness of the chewing gum sticks within the package by ¼ of an inch. This will create slack when standard packages are used. Alternatively, if the size of the package is reduced, the consumer may perceive the smaller package as indicative of a reduction in the amount of product contained therein.

A manufacturer may also wish to increase the size of the multi-stick package to give consumers the impression of greater product quantity without actually increasing the weight of product contained therein.

One approach to controlling the thickness of a gum stick is to use various means to adjust (usually lower) the density of the gum product. For example, U.S. Pat. No. 4,733,319, U.S. Pat. No. 4,491,596, U.S. Pat. No. 5,045,326, and U.S. Pat. No. 5,324,530 all disclose methods for reducing gum density. Such methods typically involve difficult and expensive mechanical methods which may adversely affect texture and/or shelf life of the product.

Therefore, there is a need for methods that allow the thickness of wrapped chewing gum stick products to be varied without creating manufacturing shelf life, product quality and packaging issues.

SUMMARY OF THE INVENTION

The present invention provides an improved chewing gum product and method for manufacturing same. Pursuant to the present invention, the thickness of the wrapped chewing gum product can be varied without unduly varying the packaging process or materials used to wrap and house the chewing gum. In this regard, methods and chewing gum products are provided that allow lines of chewing gum products to have different thicknesses.

To this end, in an embodiment the present invention provides a wrapped stick of chewing gum comprising a body constructed from a water soluble gum portion and a water insoluble base, the body including at least one embossed region and being substantially surrounded by a wrapper.

In an embodiment, the body has a substantially rectangular shape.

In an embodiment, the body has a substantially rectangular planar surface that includes a top and bottom and two sides located therebetween. The embossed region extends substantially across the surface from side to side.

In an embodiment, the stick of chewing gum includes a plurality of embossed regions.

In an embodiment, the stick of chewing gum includes a plurality of embossed regions extending from substantially the first side to the second side.

In an embodiment, the stick of chewing gum is sugarfree.

In an embodiment, the embossed region creates a pattern.

In another embodiment, the present invention provides a method for manufacturing chewing gum comprising the steps of: producing a stick of chewing gum; embossing the stick of chewing gum to produce at least one embossed region on the stick of chewing gum; and packaging the stick of gum in a wrapper.

In an embodiment, the method includes the step of wrapping the stick of chewing gum in a paper wrapper.

In an embodiment, the chewing gum stick is wrapped and housed in a single wrapper having barrier properties.

In an embodiment, the method includes the step of placing a plurality of wrapped sticks of chewing gum in a counterband package.

In an embodiment, the method includes the step of producing a plurality of embossed regions on the chewing gum.

In an embodiment, the embossed region is produced by a male and female die roller.

In an embodiment, the sticks of chewing gum are embossed with a ladder design.

In yet another embodiment, the present invention provides a wrapped chewing gum product having a body composed of a water insoluble base and water soluble portion. A plurality of embossed regions are provided that extend from a first side of the body to a second side of the body. A wrapper substantially surrounds the body.

In an embodiment, the body has a substantially rectangular shape.

In an embodiment, the embossed region has a substantially rectangular cross-sectional shape.

In an embodiment, the embossed region has a substantially uniform pattern along a length of the chewing gum stick.

In an embodiment, the chewing gum is sugarfree.

In an embodiment, the embossed regions create a ladder design.

Accordingly, it is an advantage of the present invention to provide an improved chewing gum product.

Another advantage of the present invention is to provide an improved method for manufacturing chewing gum products.

Furthermore, an advantage of the present invention is that it allows a reduction in wrapping material to reduce environmental burden and manufacturing cost while preserving the overall size of the package.

Still further, an advantage of the present invention is to provide a method for allowing one to reduce the thickness of the chewing gum product due to customer preference, design issues, or for any other reason while still being able to maintain the same packaging as for a thicker product.

Moreover, an advantage of the present invention is to provide an improved method for allowing manufacturers to reduce the stick weight of chewing gum due to customer preference, design issues, or for any other reason without unduly modifying standard packaging protocols and materials.

Still another advantage of the present invention is to provide a larger package packaging without increasing the product weight or packaging slack.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an improved chewing gum product and method for manufacturing same.

Pursuant to the present invention, an improved chewing gum product is provided that has an increased apparent thickness. This allows the chewing gum product to in reality have a reduced thickness but still be able to be run on packaging machines that are designed to package thicker chewing gum sticks. Likewise, by providing an apparent increase in thickness this allows reduced thickness chewing gum sticks to be wrapped in the same wrapper as thicker chewing gum sticks, as well as to be housed in counterbands designed for a thicker stick chewing gum product.

To this end, a chewing gum product is provided that is embossed. As used herein and in the claims, embossed means that one side of the chewing gum stick is indented (debossed) so that the other side of the chewing gum stick has a raised (embossed) portion. The embossed region can take on any number of shapes and designs. Although, as discussed in more detail below, a preferred embodiment of the embossed chewing gum stick includes substantially rectangular trough areas that run from one side to the other side of the chewing gum stick, the embossed areas can be circular, square, triangular, etc. Nor do the embossed areas have to extend from one side of the chewing gum stick to the other, e.g. they can extend from top to bottom or only for a portion of the stick of chewing gum.

Due to the embossed area, the chewing gum stick includes raised portions that when the stick of chewing gum is wrapped, will provide an apparent thickness equal to or close to that of a standard chewing gum stick. This allows for the use of the same size multi-stick packaging (counterband) without slack or significant compressibility. Accordingly, this affords the manufacturer the ability to modify the thickness of chewing gum, e.g. pursuant to design changes or customer preference, and at the same time be able to use existing packaging machines and materials.

Figure 1:
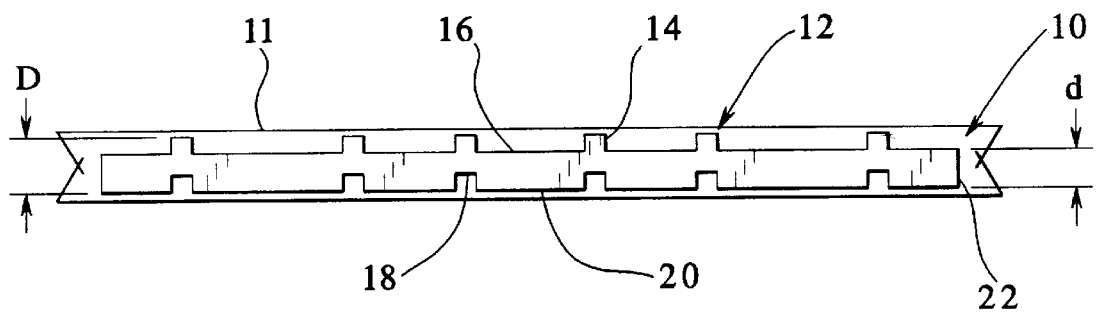
FIG. 1 illustrates a side elevational view of an embodiment of a wrapped chewing gum stick embossed pursuant to the present invention.
Figure 3:
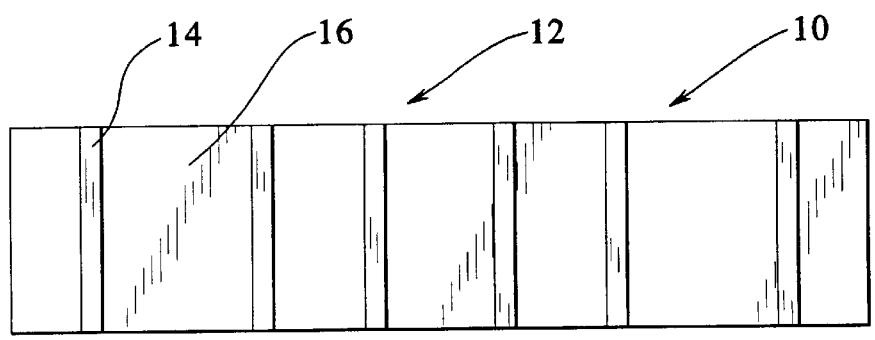
FIG. 3 illustrates a top plan view of the chewing gum stick of FIG. 1 with wrapper removed.

Referring now to the Figures and specifically FIGS. 1 and 3, a preferred embodiment of the chewing gum stick 10, in a wrapper 11, embossed pursuant to the present invention, is illustrated. The embossed region 12, (exaggerated to show detail) creates a raised region 14 on a top side 16 of the chewing gum stick 10. Corresponding to the raised region 14 is a depressed, or debossed, area 18 on the bottom side 20 of the chewing gum stick 10. Accordingly, as illustrated in FIG. 1, the chewing gum stick will have embossed areas 12 extending from a top surface 16 thereof and debossed areas 18 creating depressions on a bottom surface 20 thereof.

In the preferred embodiment illustrated, the embossed regions 12 create a ladder design on the top 16 surface of the chewing gum stick 10. If desired, the embossed region areas 12 can create a uniform pattern. However, this is not necessary and the embossed region can create a random or nonuniform pattern.

Figure 2:
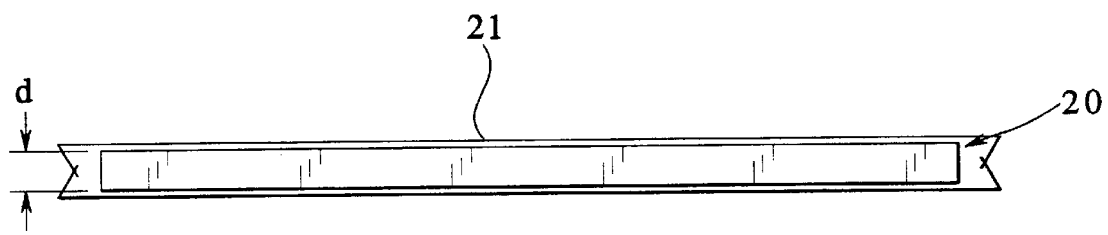
FIG. 2 illustrates a side elevation view of an unembossed prior art chewing gum stick, in a wrapper.

Referring now to FIG. 2, the unembossed chewing gum stick of the prior art 20, in a wrapper 21, is illustrated. As illustrated, the chewing gum stick 20 has a thickness "d". Referring to FIG. 1 due to the embossed regions 12, the chewing gum stick 10 has a thickness of "D" even though portions 22 of the stick 10 still have a thickness of "d". Furthermore, the wrappers 11 and 21 assume dimensions corresponding to "d" and "D" for the sticks 10 and 20 respectively thus giving an effectively increased thickness in the wrapped gum of the present invention.

Figure 4:
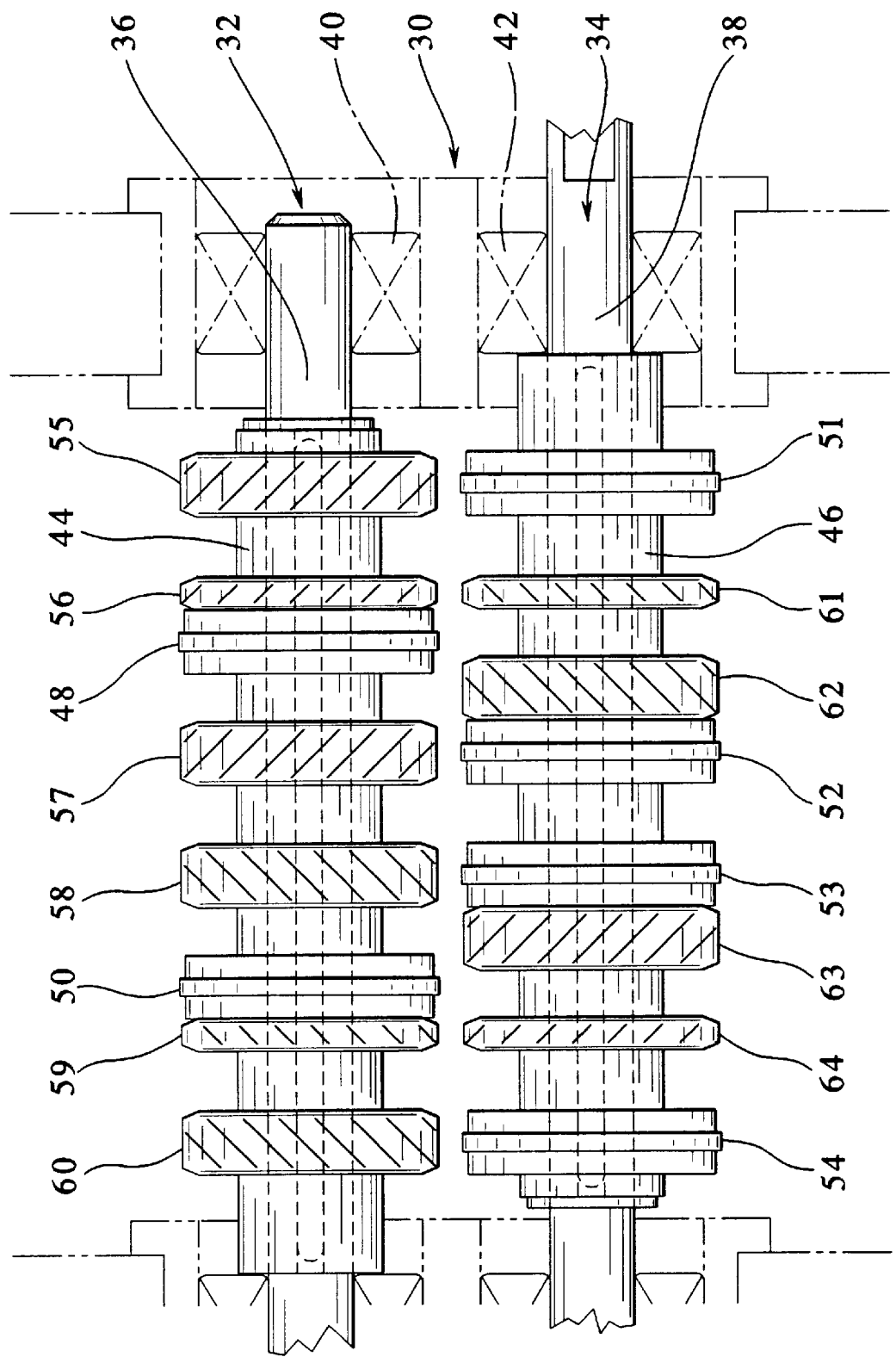
FIG. 4 illustrates a top plan view of a top pair of die rollers for the sequential embossing (debossing) of a chewing gum product.
Figure 5:
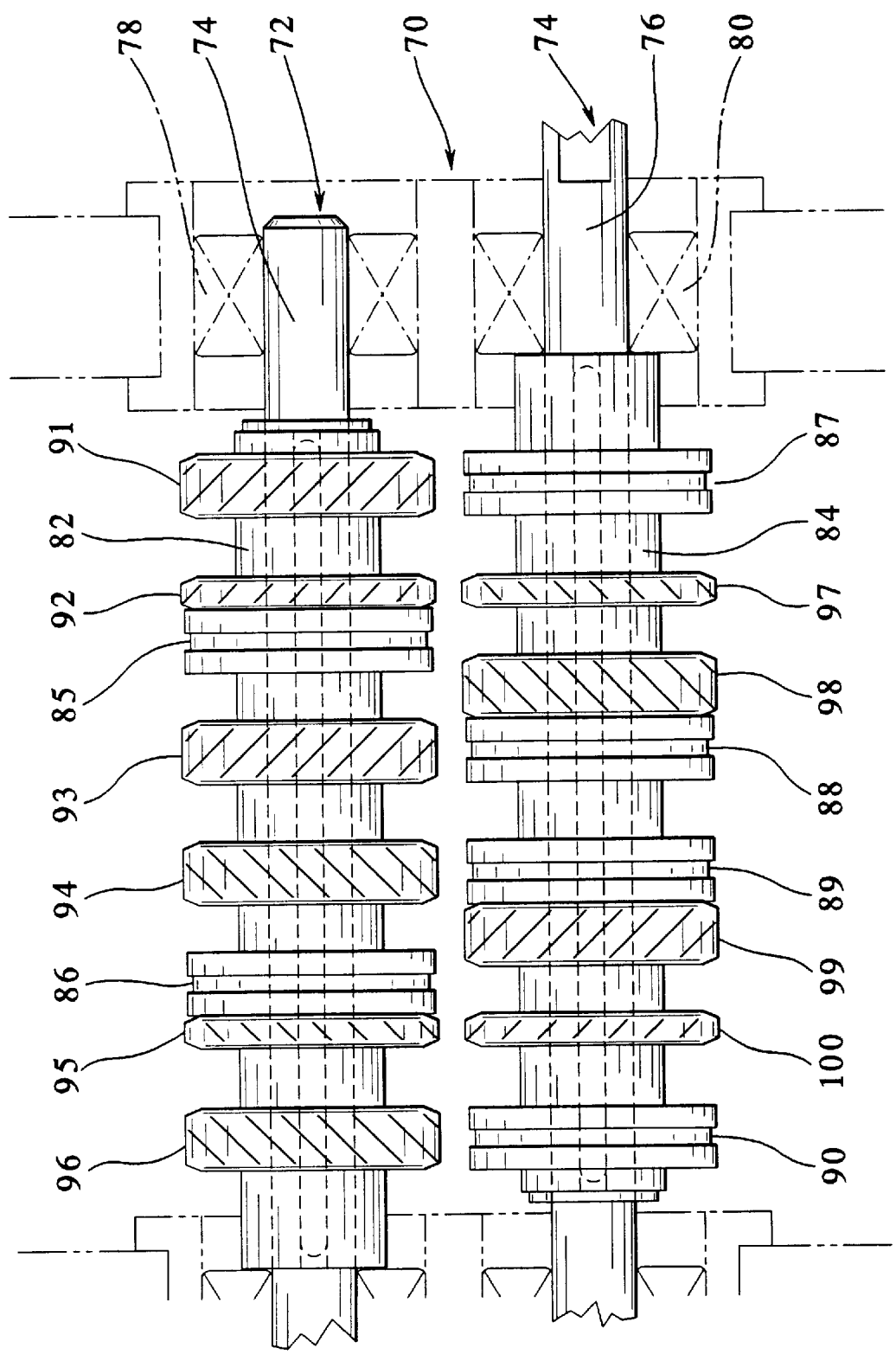
FIG. 5 illustrates a top plan view of a corresponding bottom pair of embossing die rollers, for embossing the chewing gum product.

Referring now to FIGS. 4 and 5, a preferred embodiment of the dies for embossing the chewing gum product are illustrated. FIG. 4 illustrates the top or male die 30. FIG. 5 illustrates the bottom or female die 70. These dies 30 and 70 are located in juxtaposition to each other allowing a sheet of chewing gum to pass there between.

The die rollers 30 of FIG. 4 are debossing rollers. In the preferred embodiment illustrated two rollers 32 and 34 are provided. However, if desired, more or less rollers can be used. Each roller 32 and 34 includes a rotational shaft 36 and 38, respectively. The rotational shaft 36 and 38 is carried on a bearing 40 and 42 respectively. Die shafts 44 and 46 are provided which carry the debossing die wheels 48 and 50 of roller 32 and 51, 52, 53, and 54 of roller 34. Frictional drive wheels 55, 56, 57, 58, 59, and 60 are provided on roller 32. And frictional drive wheels 61, 62, 63, and 64 are provided on roller 34. The frictional drive wheels are provided assist in moving a chewing gum sheet through the die assembly.

FIG. 5 illustrates the corresponding pair of embossing die rollers 70. The embossing die rollers 70 correspond to the debossing die rollers of FIG. 4. Accordingly, two roller assemblies 72 and 74 are provided.

Once again, the embossing die rollers in FIG. 5 include a rotational shaft 74 and 76 respectively which are carried on bearings 78 and 80 respectively. Die shafts 82 and E4 are provided. The die shafts 82 and 84 carry embossing die wheels 85 and 86 and 87, 88, 89, and 90 respectively. Frictional drive wheels 91, 92, 93, 94, 95, and 96 are provided on die shaft 82 and 97, 98, 99, and 100 on die shaft 84. The frictional drive wheels assist in moving the chewing gum sheets through the die assembly.

The embossing pattern may be selected on the basis of aesthetic considerations. In this regard it may represent, if desired, a trademark, corporate logo, or promotional theme. In a preferred embodiment, the embossing pattern substantially spans the width and length of the stick in order to create a relatively uniform increase in apparent thickness across the entire surface of the chewing gum stick.

Due to the elasticity of the chewing gum, and possible failure of the gum to be forced fully into the female die, it may be necessary to make the die recesses deeper than the desired thickness in the embossing. The exact degree of compensation will vary depending on the composition and temperature of the gum. Likewise, the speed of the embossing process and pattern of the embossing may affect the die recesses. In general, the die will typically be deeper than the desired embossing thickness. Corresponding compensation on the debossing die may also be necessary.

The dies for embossing and debossing and creating a necessary pattern, may be conveniently located along the rollers that are typically used in the chewing gum process. For example, such rollers can serve to reduce the gum sheet to a final thickness, score, and/or cut the gum sheet. The debossing and embossing rollers can be located at any position along this process. In this regard, the embossing operation may be carried out anywhere between the sheeting and wrapping process.

A variety of chewing gum compositions can be embossed pursuant to the present invention. A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and coca butter. Commonly used waxes include petroleum waxes such as paraffin and a microcrystalline wax, natural waxes such as beeswax, candelilla, carnauba and polyethylene wax. If desired, a wax free base composition can so be utilized. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate;

and optional ingredients such as antioxidants, colors and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewing ability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination. Chewing gums of the present invention will use sugarless sweeteners exclusively or at least include same as a major portion of the bulk sweetener.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include, but are not limited to, sucrose, aspartame, salts of acesulfame, alitame, saccharin and its salts, cyclamic acid and its salts, glycyrrhizin, dihydrochalcones, thaumatin, monellin, and the like, along or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 01–15% by weight of the chewing gum, preferably between about 0–25% by weight of the chewing gum, most preferably between about 0.5–3% by weight of the chewing gum. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into pieces. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further, parts of the bulk portion may then be added to the mixer. Flavoring agents are typically added with the final part of the bul portion. The entire mixing process typically takes from five to fifteen minutes. Although longer mixing times are sometimes required. Those skilled in the art will recognize that variations of this mixing procedure, or other mixing procedures, may be followed.

By way of example and not limitation, Examples of the present invention will now be given.

EXAMPLE NO. 1

Stainless steel male and female die rollers were constructed as illustrated in FIGS. 4 and 5. The dies were machined to give 20 thousands of embossing/debossing with the appreciation that actual emboss thickness would be significantly less when the gum relaxed after exiting the embossing apparatus. Chewing gum was manufactured from commercial production formula of sugar gum and sheeted 2.85 inches in length, 0.75 inch width, and 0.067 inch thick. Sheets of scored gum, one stick length wide, were fed into the die rollers, long edge of the sticks first. The sticks were embossed with a ladder design similar to that of FIGS. 1 and 3.

The embossed product had an apparent thickness of 0.071, an increase of 0.004 over the unembossed thickness of 0.067.

15 to 20 boxes of the embossed product, as well as unembossed control, were wrapped in standard wrapping materials using a production wrapping machine. The wrapped, embossed packages had noticeably less slack than the wrapped unembossed packages.

EXAMPLE NO. 2

The stainless steel male and female die rollers illustrated in FIGS. 4 and 5 were used as set forth in Example 1. Chewing gum was manufactured from commercial production sugarfree formula and sheeted 2.85 inches in length, 0.75 inch width, and 0.067 inch thick. Sheets of scored gum, one stick length wide, were fed into the die rollers, on edge of the sticks first. The sticks were embossed with a ladder design similar to that of FIGS. 1 and 3.

The embossed product had an apparent thickness of 0.071, an increase of 0.004 over the unembossed thickness of 0.067.

15 to 20 boxes of the embossed product, as well as unembossed control, were wrapped in standard wrapping materials using a production wrapping machine. The wrapped, embossed packages had noticeably less slack than the wrapped unembossed packages.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A wrapped stick of chewing gum comprising:
   a chewing gum body composed of a water soluble gum portion and a water insoluble base, the body comprising first and second sides and an apparent thickness, the body including at least one embossed region and a nonembossed region, the embossed region comprising a raised region on the first side of the body and a depressed region on the second side of the body opposite the raised region, the nonembossed region having a thickness that is less than the apparent thickness of the body, and the body being at least substantially surrounded by a wrapper.

2. The stick of chewing gum of claim 1 wherein the body has a substantially rectangular shape.

3. The stick of chewing gum of claim 1 wherein:
   the body includes a substantially rectangular planar surface having a top portion, a bottom portion, a first side, and a second side; and the embossed region substantially extends from the first side to the second side.

4. The stick of chewing gum of claim 1 including a plurality of embossed regions.

5. The stick of chewing gum of claim 1 wherein the chewing gum is sugarfree.

6. The stick of chewing gum of claim 1 wherein the embossed region creates a pattern.

7. A method for manufacturing chewing gum comprising the steps of:

reducing the thickness of a two-sided stick of chewing gum;

embossing the stick of chewing gum by passing the stick between at least one pair of male and female die rollers to produce at least one embossed region on the stick of chewing gum that comprises a raised region on one side of the stick of gum and a depressed region on the other side of the stick of gum opposite the raised region; and packaging the stick of chewing gum in a wrapper.

8. The method of claim 7 including the step of wrapping the stick of chewing gum in a paper wrapper.

9. The method of claim 7 wherein the chewing gum stick is wrapped and housed in a single wrapper having barrier properties.

10. The method of claim 7 including the steps of placing a plurality of wrapped sticks of chewing gum in a counterband package.

11. The method of claim 7 including the step of producing a plurality of embossed regions on the chewing gum.

12. The method of claim 7 wherein the sticks of chewing gum are embossed with a ladder design.

13. A wrapped chewing gum product comprising:

a chewing gum body composed of a water insoluble base and water soluble portion, the body comprising first and second sides and an apparent thickness;

a plurality of embossed regions each comprising a raised region on the first side of the body and a depressed region on the second side of the body opposite the raised region;

a plurality of nonembossed regions that are located on the body adjacent the embossed regions;

the nonembossed regions having a thickness that is less than the apparent thickness of the body; and a wrapper that substantially surrounds the body.

14. The chewing gum product of claim 13 wherein the body has a substantially rectangular shape.

15. The chewing gum product of claim 13 wherein the embossed regions have a substantially rectangular cross-sectional shape.

16. The chewing gum product of claim 13 wherein the embossed regions have a substantially uniform pattern along a length of the chewing gum stick.

17. The chewing gum product of claim 13 wherein the chewing gum is sugarfree.

18. The chewing gum product of claim 13 wherein the embossed regions create a ladder design.

19. A method for reducing the cross-sectional thickness of at least a portion of a chewing gum stick and allowing the chewing gum stick to be packaged in a standard wrapper comprising the steps of:

reducing the thickness of a two-sided stick of chewing gum;

embossing the stick of chewing gum by passing the stick between at least one pair of male and female die rollers to produce at least one embossed region and at least one nonembossed region on the stick of chewing gum, the embossed region comprising a raised region on one side of the stick of gum and a depressed region on the other side of the stick of gum opposite the raised region resulting in the stick of gum having an apparent thickness greater than the thickness of the nonembossed region of the stick; and packaging the stick of chewing gum in a wrapper.

* * * * *